United States Patent
Chiang et al.

(10) Patent No.: US 7,318,125 B2
(45) Date of Patent: Jan. 8, 2008

(54) RUNTIME SELECTIVE CONTROL OF HARDWARE PREFETCH MECHANISM

(75) Inventors: Men-Chow Chiang, Austin, TX (US); Kaivalya M. Dixit, Austin, TX (US); Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 10/850,426

(22) Filed: May 20, 2004

(65) Prior Publication Data

US 2005/0262307 A1 Nov. 24, 2005

(51) Int. Cl.
*G06F 9/00* (2006.01)
*G06F 12/00* (2006.01)

(52) U.S. Cl. .................. 711/137; 711/169; 712/207

(58) Field of Classification Search .............. 711/137
See application file for complete search history.

(56) References Cited

U.S. PATENT DOCUMENTS

| | | | | |
|---|---|---|---|---|
| 5,179,702 A | * | 1/1993 | Spix et al. ................ 718/102 |
| 5,349,680 A | * | 9/1994 | Fukuoka ................... 718/108 |
| 5,826,079 A | * | 10/1998 | Boland et al. ............. 718/102 |
| 5,889,985 A | * | 3/1999 | Babaian et al. ........... 712/225 |
| 6,233,645 B1 | * | 5/2001 | Chrysos et al. ........... 710/244 |
| 6,311,260 B1 | * | 10/2001 | Stone et al. ............... 711/213 |
| 6,795,876 B1 | * | 9/2004 | Solomon ..................... 710/34 |
| 7,096,322 B1 | * | 8/2006 | Sollom et al. ............. 711/143 |
| 2002/0073406 A1 | * | 6/2002 | Gove ........................ 717/154 |
| 2003/0225996 A1 | * | 12/2003 | Thompson ................. 712/207 |

OTHER PUBLICATIONS

Chen T. et al., "A Performance Study of Software and Hardware Data Prefetching Schemes," Proceeding of the 21st International Symposium on Computer Architecture, pp. 223-232, 1994.*

* cited by examiner

*Primary Examiner*—Matthew Kim
*Assistant Examiner*—Michael Krofcheck
(74) *Attorney, Agent, or Firm*—Duke W. Yee; Casimer K. Salys; James O. Skarsten

(57) ABSTRACT

A control mechanism that allows individual applications to turn hardware prefetch on or off is provided. By preliminary trial run one can determine precisely whether an application will benefit or suffer from hardware prefetch. The selective control of prefetching by individual applications is made possible by associating a status bit with individual processes in the machine status word of each processor. Using this prefetch bit, a process turns prefetching on or off to its own advantage in the processor core immediately after a context switch.

25 Claims, 4 Drawing Sheets

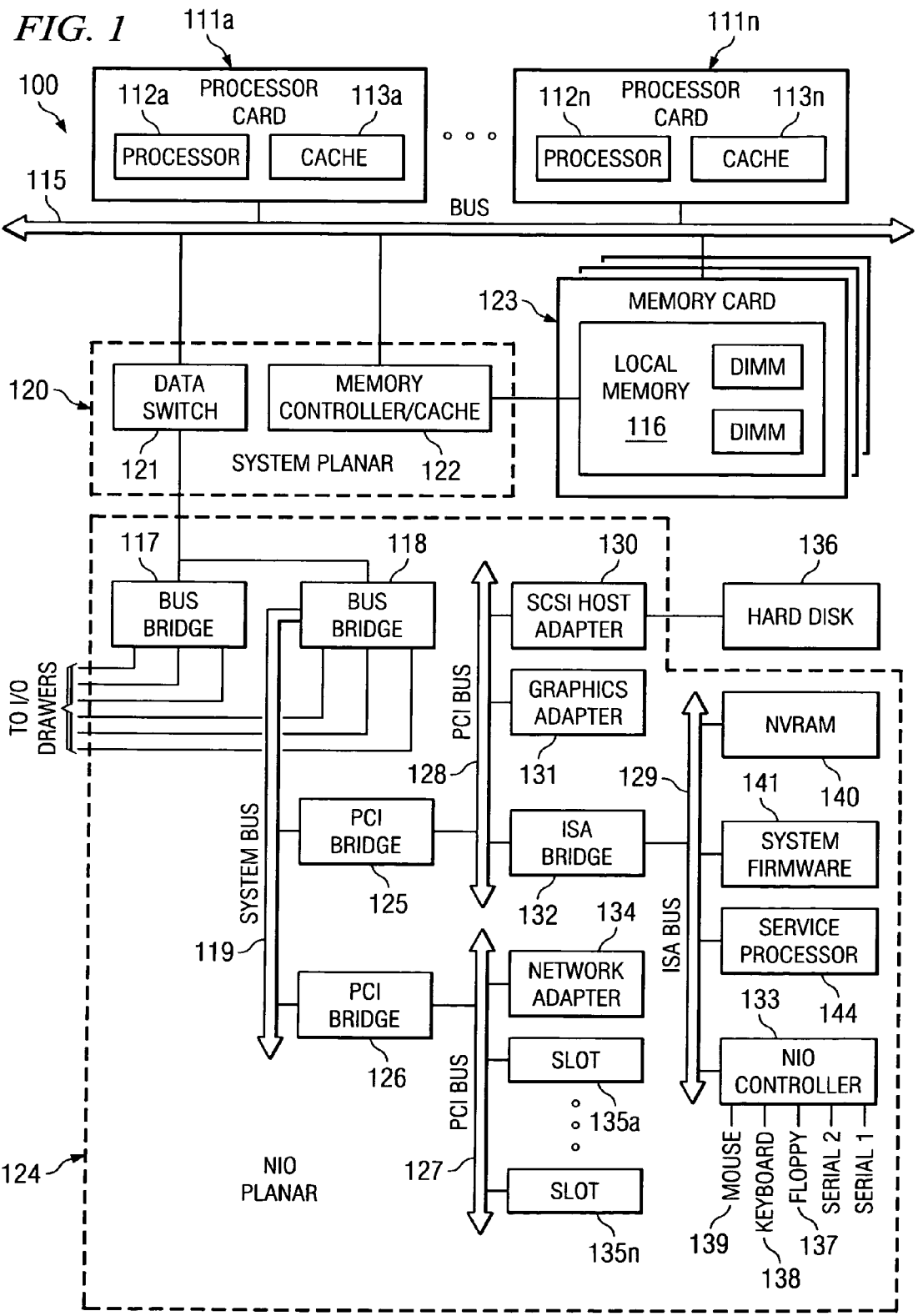

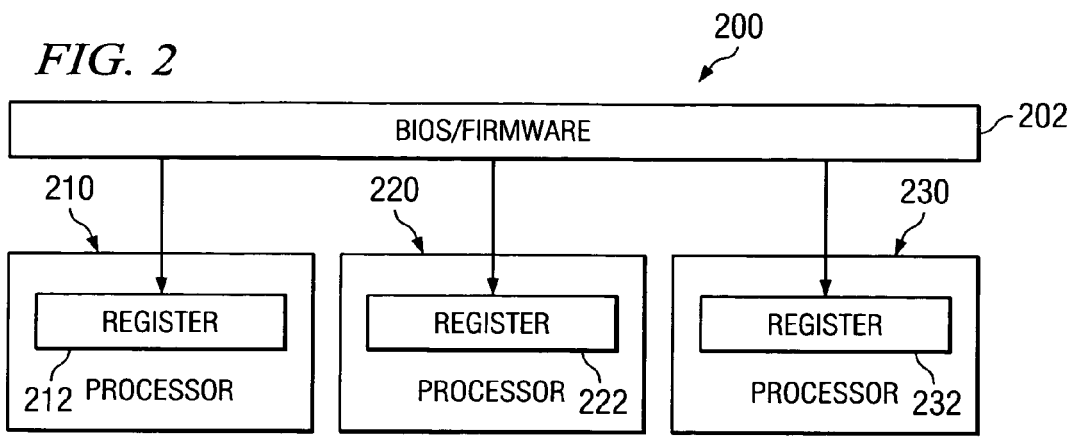
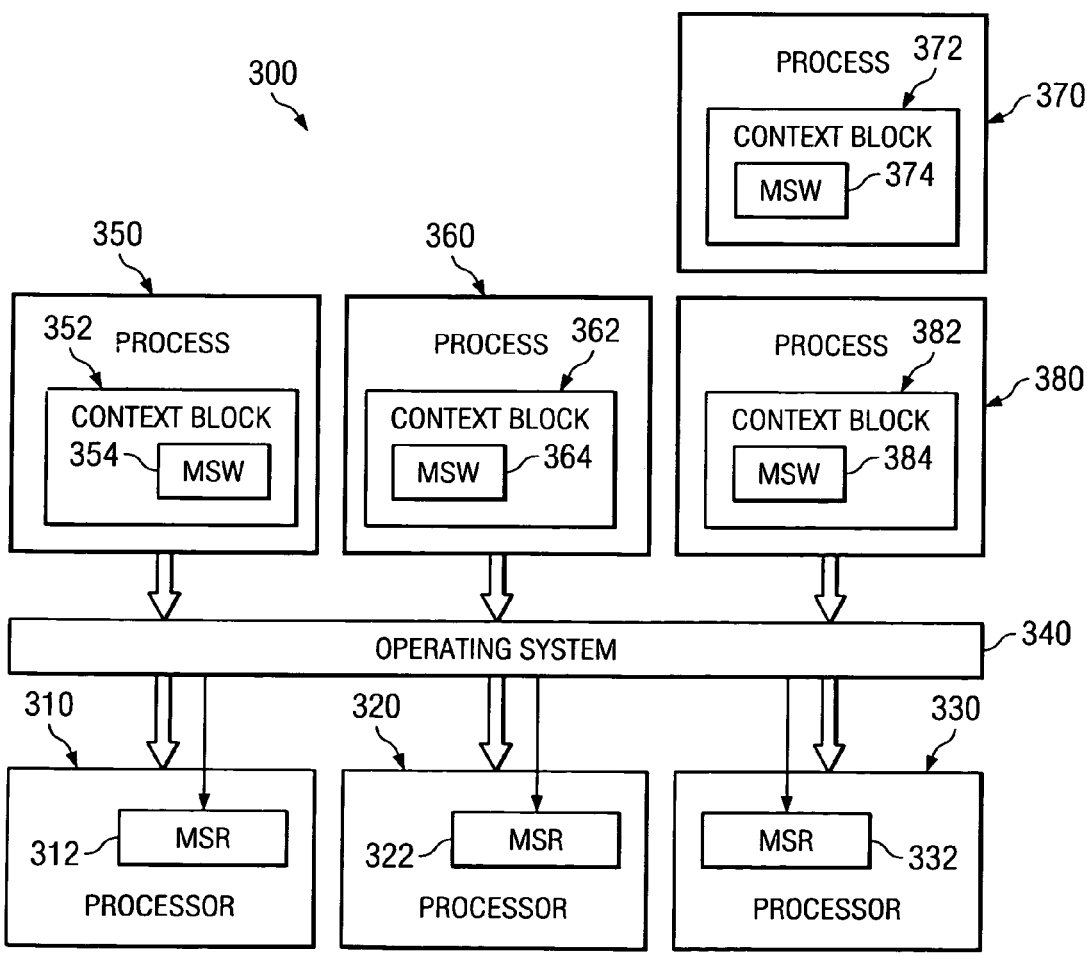

RUNTIME SELECTIVE CONTROL OF HARDWARE PREFETCH MECHANISM

BACKGROUND OF THE INVENTION

1. Technical Field

The present invention relates to data processing. systems and, in particular, to hardware cache prefetch in single processor and multiple processor data processing systems. Still more particularly, the present invention provides runtime selective control of hardware prefetch in a data processing system.

2. Description of Related Art

Many current processor architectures implement hardware prefetch. The prefetch works as follows: upon detecting sequential memory access pattern in an executing program the computer hardware starts to prefetch cache lines from main memory to L1/L2 caches. The purpose is to make the data available to the executing program in the low latency cache when the data is actually accessed later, thereby reducing the average memory access time.

Hardware prefetch unfortunately does not always help processor performance. Prefetch may be falsely triggered, for example, by a short stretch of fixed stride access patterns, or any other hardware prefetch triggering scheme. As a result the data prefetched are mostly not used by the program. In this case the performance can actually be worse due to cache pollution, because prefetched data may displace useful data in the cache and, thus, increase the cache miss ratio. Also, the large number of falsely triggered prefetches may consume a significant amount of memory bandwidth, thereby increasing the queuing delay of every memory access, resulting in higher a average memory access time.

Note that this problem has serious negative implications in a multi-user multi-processor (MP) environment. Falsely triggered prefetch by one application may flood the memory system, which is shared by all applications running at the same time. These applications may suffer a tremendous negative performance impact from longer memory access time, even though they themselves may not engage in any prefetching activity.

The problem becomes more complicated with the advent of logical partition (LPAR) and shared processor logical partition (SPLPAR), where multiple different and unrelated business customers may share an MP system. In this case one rogue application that generates a high volume of falsely triggered prefetching requests in one partition will likely affect all of the applications running in the other partitions that belong to the other business customers.

There is strong evidence that prefetch can significantly degrade the performance of some real applications. In some tests, measurements from hardware performance counters have shown average memory access times of a few thousand cycles, instead of the normal less than one hundred cycles. This is a fairly good indication that prefetching has overwhelmed the memory system.

The main cause for the dilemma in hardware prefetching is that the setting of a prefetch policy is for the whole system for the entire time the system is operating. Prefetch is turned on or turned off at system boot time. Once prefetch is turned on, hardware prefetch is active in all processors with all applications, opening the possibility that one application can significantly degrade the performance of all other applications, including itself, as described above.

Turning off prefetch for the whole system may not be a good option because there are significantly many applications, especially scientific applications, that may benefit enormously from hardware prefetching. This is the main reason that many computer manufacturers currently ship systems with prefetch turned-on by default.

SUMMARY OF THE INVENTION

The present invention recognizes the disadvantages of the prior art and provides a control mechanism that allows individual applications to turn hardware prefetch on or off. By preliminary trial run one can determine precisely whether an application will benefit or suffer from hardware prefetch. The selective control of prefetching by individual applications is made possible by associating a status bit with individual processes in the machine status word of each processor. Using this prefetch bit, a process turns prefetching on or off to its own advantage in the processor core immediately after a context switch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of an illustrative embodiment of a data processing system with which the present invention may advantageously be utilized;

FIG. 2 illustrates an example of a typical hardware prefetch implementation;

FIG. 3 depicts an example of an implementation of hardware prefetch in a data processing system in accordance with a preferred embodiment of the present invention;

DETAILED DESCRIPTION OF THE PREFERRED EMBODIMENT

Figure 4:
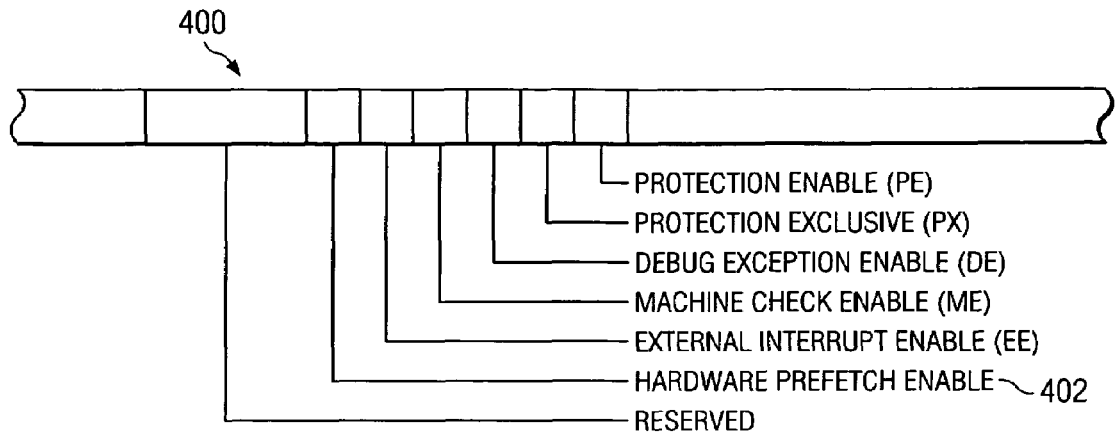
FIG. 4 depicts an example machine status register in accordance with a preferred embodiment of the present invention.

Referring now to the drawings and in particular to FIG. 1, there is depicted a block diagram of an illustrative embodiment of a data processing system with which the present invention may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that includes local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Furthermore, the example shown in FIG. 1 depicts a data processing system that uses a shared bus that connects the processors, caches, and other hardware elements together. However, data processing system 100 may include any other type of interconnection network, such as a cross-bar switch, for example. In addition, the caches are shown on the processor side of the shared bus. However, a cache can be on either side of the interconnect network. The exemplary aspects of the present invention may be applied to hardware prefetch for caches on either side of the bus or other interconnect network. In fact, in some implementations, there may be caches on both sides of the interconnect network. The exemplary aspects of the present invention may improve prefetch performance regardless of the cache configuration.

In a prior art implementation of a data processing system, prefetch policy is for the whole system for whole time. The prefetch is turned on or turned off at system boot time. Once it is turned on, hardware prefetching is active in all processors with all applications, opening the possibility that one application can significantly degrade the performance of all, including itself as described above. For example, when data processing system 100 is turned on in a prior art implementation, hardware prefetching may be turned on or off for all of processors 112a-112n. The status of hardware prefetching may not change until data processing system 100 is powered down or rebooted.

FIG. 2 illustrates an example of a typical hardware prefetch implementation. When data processing system 200 is turned on, BIOS/firmware 202 sends a prefetch status, as well as other machine settings, for processors 210, 220, 230 to registers 212, 222, 232. The settings in BIOS/firmware 202 may be set using a BIOS setup interface, for example, as known in the art. In other words, a use may apply settings to turn hardware prefetch on or off and store the settings in BIOS/firmware 202. These settings are then applied to all processors for the entire time data processing system 200 is operational or until the settings are changed.

In accordance with a preferred embodiment of the present invention, a control mechanism allows individual applications to turn hardware prefetch on or off. By a preliminary trial run one can determine precisely whether an application will benefit or suffer from hardware prefetch. The selective control of prefetching by individual applications is made possible by associating a status bit with individual processes in the machine status word of each processor. Using this prefetch bit, a process turns prefetching on or off to its own advantage in the processor core immediately after a context switch.

FIG. 3 depicts an example of an implementation of hardware prefetch in a data processing system in accordance with a preferred embodiment of the present invention. Data processing system 300 is a multiprocessing system employing processors 310, 320, 330. Operating system 340 executes processes 302-308 on processors 310, 320, 330.

In a preferred embodiment, a hardware prefetch status bit may be stored in a register within processors 310, 320, 330. In the depicted example, processors 310, 320, 330 include machine status registers 312, 322, 332, respectively, and operating system 340 is configured to perform system calls to write to machine status registers 312, 322, 332. A machine status register (MSR), also referred to as a machine state register, is a register in a processor that defines certain states of the processor. In a preferred embodiment of the present invention, MSRs 312, 322, 332 include a hardware prefetch status bit.

Operating system 340 assigns processes 350, 360, 370, 380 to processors 310, 320, 330. Processes 370 and 380 run on processor 330 at distinct time intervals. Each process includes a context block that includes a machine status word (MSW). The machine status word corresponds to the machine status register and is used to set hardware states in the processor. Rather than enabling or disabling hardware prefetch for all processors, operating system 340 enables or disables hardware prefetch individually for each processor based on the MSW in the context block of the process assigned to the processor. Using the prefetch status bit in the MSW, a process can turn prefetching on or off to its own advantage in the processor core immediately after a context switch.

The advantage of this selective control of hardware prefetch by individual processes, thus individual applications, is that the system will enjoy all the benefits of prefetching while minimizing the negative consequence from falsely triggered prefetching. In particular this selective mechanism completely avoids the aforementioned problem of one rogue application that generates high volume of falsely triggered prefetches to significantly slow down the applications running in other processors or other partitions.

The selective control of hardware prefetching can be further refined by allowing a program to change the prefetch status midway through execution, likely through a system call. This allows an application to tailor prefetch need separately for its individual computational phases, i.e., turning-on and turning-off the hardware prefetch as needed during the program execution.

FIG. 4 depicts an example machine status register in accordance with a preferred embodiment of the present invention. Machine status register 400, or a corresponding machine status word, includes, for example, a protection enable (PE) status bit, a protection exclusive (PX) status bit, a debug exception enable (DE) status bit, a machine check enable (ME) status bit, and an external interrupt enable (EE) status bit.

Machine status register 400 may include more or fewer status bits depending upon the implementation and the particular processor architecture. However, the machine status register of the present invention also preferably includes a hardware prefetch enable status bit 402. When hardware prefetch enable status bit 402 is in an "on" or "enable" state, the processor uses hardware prefetch to retrieve data and/or instructions to cache before being processed. When hardware prefetch enable status bit 402 is in an "off" or "disable" state, the processor does not use hardware prefetch.

Usually, a developer has a very clear idea of whether hardware prefetch will help the performance of an application by just running the application with and without prefetch enabled in a machine and comparing the performance. The developer may either store this information within the executables using a compiler or supply this information when submitting the application for running. The operating system will tag a prefetch "on" or "off" status with the processes that are associated with the application. When the process is context-switched to run on a processor, the prefetch status bit will be loaded into its machine status word, which in turn controls the prefetching status during the time that particular process is active in this processor core.

In a refined version where the prefetch status (or preference) bit can be modified midway through execution, a system call for this purpose may be implemented to change the status bit in the MSR. This more flexible control of the hardware data prefetch allows a wide range of program tuning opportunities. For example, a programmer, with intimate knowledge of program data access pattern, can annotate the source code manually to inform the hardware when to turn-on or turn-off during different computational phases. The programmer can, thus, incrementally increase the effectiveness of his prefetch annotation by repeatedly refining it through trial and error on a machine that allows such convenience and flexibility of prefetch control.

Figure 5:
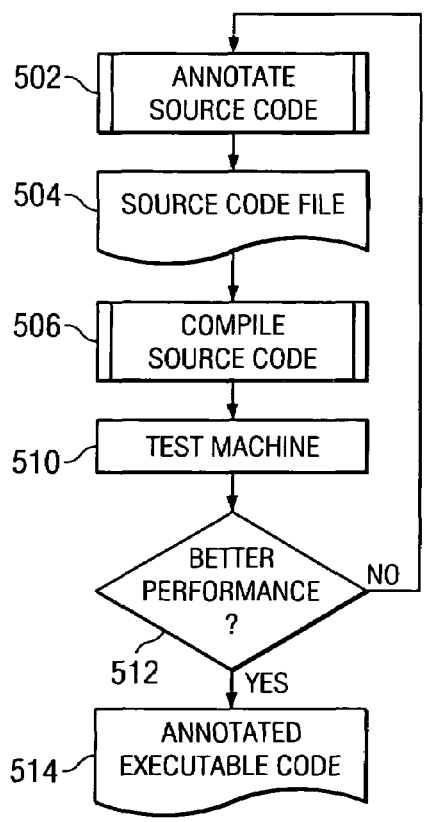
FIG. 5 illustrates operational flow of a trial-and-error annotation process in accordance with an exemplary embodiment of the present invention.

FIG. 5 illustrates operational flow of a trial-and-error annotation process in accordance with an exemplary embodiment of the present invention. The developer annotates code (block 502) in source code file 504. The source code is annotated with a context block that includes a machine status word. That is, the application is annotated to either enable hardware prefetch or to disable hardware prefetch. Alternatively, the source code may be annotated with system calls to turn prefetch on or off during execution. Thus, portions of the application may take advantage of hardware prefetch while other portions of the application may operate without prefetch if the developer determines that hardware prefetch would not be of benefit.

The developer then compiles the source code (block 506) and runs the compiled code on test machine 510. The developer then determines whether the annotated and compiled code provides a better performance (block 512). If the annotated code provides the better performance, annotated source code 514 may be provided for the application. However, if the source code is annotated again in block 502 until the best performing code is achieved through trial-and-error.

Figure 6:
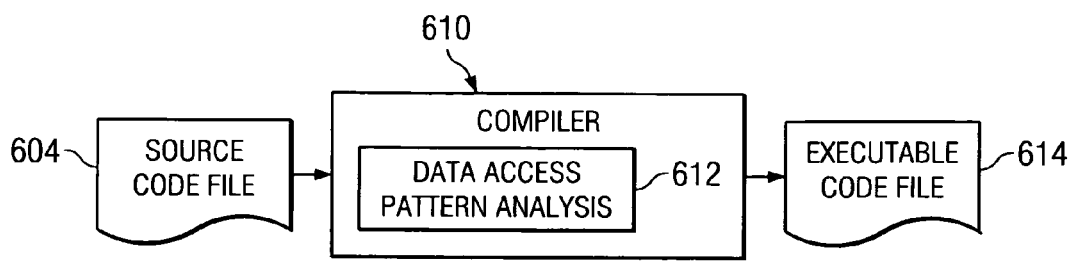
FIG. 6 is a block diagram illustrating a compiling process in accordance with an exemplary embodiment of the present invention.

FIG. 6 is a block diagram illustrating a compiling process in accordance with an exemplary embodiment of the present invention. Compiler 610 includes data access pattern analysis 612. Source code file 604 is provided to compiler 610, which analyzes the source code and generates executable code file 614. The compiler analyzes the source code for data access patterns that may benefit from hardware prefetch and data access patterns that may falsely trigger prefetches. Compiler 610 enables prefetch in the generated code when a performance gain is certain and disables prefetch when a performance loss is certain.

Data access pattern analysis 612 may detect fixed-stride access or any other hardware prefetch triggering scheme. While in many current hardware implementations the prefetch is triggered upon detecting sequential access patterns, some systems actually use more sophisticated algorithms. For example, the prefetch may be triggered by any fixed-stride memory access. Sequential access is a special case of fixed-stride access where the stride is +1 or −1 (i.e. adjacent cache lines). Non-sequential, fixed-stride memory access is common in technical code, such as when a matrix is accessed along a dimension where matrix elements are not laid out sequentially. An example may be a two-dimensional matrix that is laid out row-order in computer programs written in C language. If accessed by column, the stride is fixed, but is not sequential except when the matrix is very small.

Figure 7:
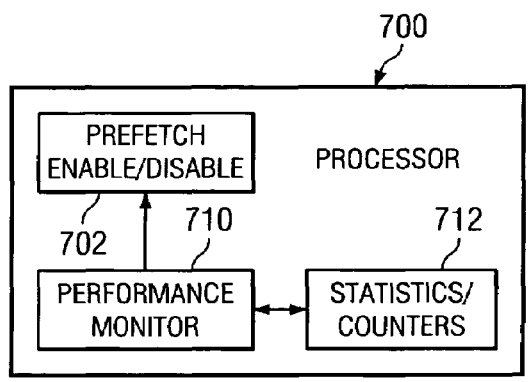
FIG. 7 illustrates a processor architecture in accordance with an exemplary embodiment of the present invention.

FIG. 7 illustrates a processor architecture in accordance with an exemplary embodiment of the present invention. Processor 700 includes performance monitor 710, which stores carefully chosen prefetch performance statistics in a set of counters 712. Performance monitor 710 may enable or disable hardware prefetch for a particular application dynamically by setting prefetch enable/disable status indicator 702.

Figure 8:
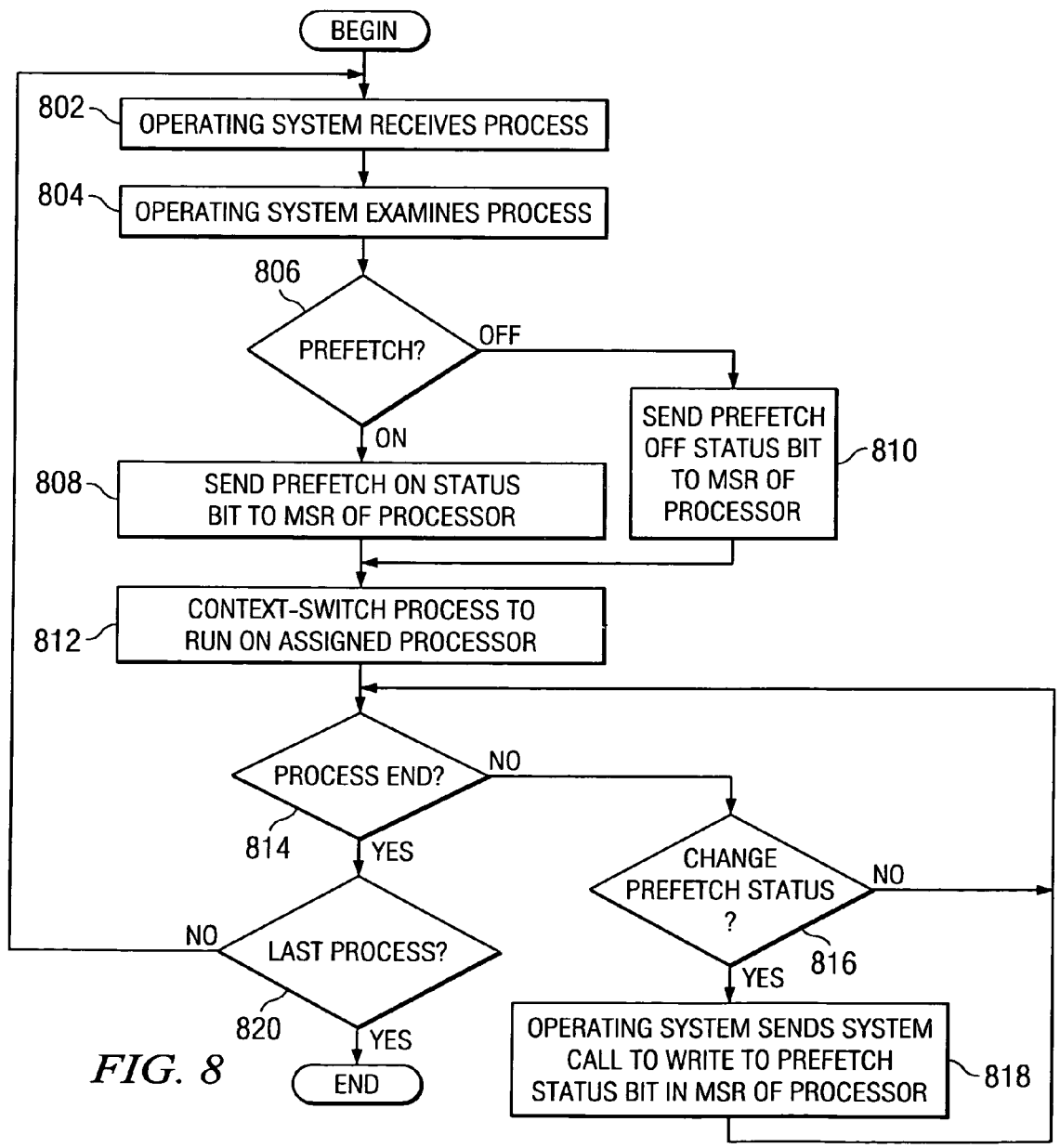
FIG. 8 is a flowchart illustrating the operation of a data processing system in accordance with a preferred embodiment of the present invention.

FIG. 8 is a flowchart illustrating the operation of a data processing system in accordance with a preferred embodiment of the present invention. The process begins and the operating system receives a process to be run on the data processing system (block 802). The operating system examines the process (block 804) and determines whether hardware prefetch should be on or off for the process (block 806).

If prefetch is to be turned on for the process, the operating system sends a prefetch on status bit to the MSR of the processor (block 808). However, if prefetch is to be turned off for the process in block 806, the operating system sends a prefetch off status bit to the MSR of the processor (block 810). Thereafter, the operating system context-switches the process to run on an assigned processor (block 812).

Next, a determination is made as to whether the process ends (block 814). If the process does not end, a determination is made as to whether a change in prefetch status occurs in the process (block 816). If a change in prefetch status does not occur, operation returns to block 814 to determine whether the process ends. However, if a change in prefetch status occurs in block 816, the operating system sends a system call to write to the prefetch status bit in the MSR of the processor (block 818). Thereafter, operation returns to block 814 to determine whether the process ends.

Returning to block 814, if the process ends, a determination is made as to whether the process is the last process to be assigned to the processor (block 820). If the process is the last process, operation ends. If the process is not the last process, operation returns to block 802 to receive the next process.

Thus, the present invention solves the disadvantages of the prior art by providing a mechanism for hardware prefetch to be enabled or disabled on a per-process basis. A developer may determine whether hardware prefetch will help the performance of an application by running the application with and without prefetch enabled in a machine and comparing the performance. Data access pattern analysis may be used by a processor to configure code to enable or disable hardware prefetch. The present invention improves performance no matter how the hardware prefetch is triggered. Thus, portions of an application may take advantage of hardware prefetch while other portions of the application may operate without prefetch if the developer or a compiler determines that hardware prefetch would not be of benefit.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, comprising:
   receiving a first process, comprising successive computational phases, to be executed by a processor in a data processing system;
   assigning the first process to run on a first processor;
   determining a first prefetch status for the first process at each of successive times when the first process is running, wherein each determined first prefetch status indicates whether hardware prefetch should be enabled or disabled for a next following computational phase of the first process;
   setting a first hardware prefetch state on the first processor based on each determined first prefetch status to correspondingly enable or disable said hardware prefetch;
   receiving a second process, comprising successive computational phases, to be executed by a processor in the data processing system;
   assigning the second process to run on a second processor;
   determining a second prefetch status for the second process at each of successive times when the second process is running, wherein each determined second prefetch status indicates whether hardware prefetch should be enabled or disabled for a next following computational phase of the second process; and
   setting a second hardware prefetch state on the second processor based on each determined second prefetch status, to correspondingly enable or disable said hardware prefetch.

2. The method of claim 1, wherein a hardware prefetch of each processor of said data processing system is individually enabled or disabled, selectively.

3. The method of claim 1, wherein determining a prefetch status includes examining a prefetch status indicator in a given process.

4. The method of claim 3, wherein the prefetch status indicator is a bit in a machine status word.

5. The method of claim 1, wherein setting a hardware prefetch state on a given processor includes writing a machine status word to a machine status register in the given processor.

6. The method of claim 1, further comprising:
   context-switching the second process to run on the first processor.

7. The method of claim 5, wherein the the machine status word is included in a context block of the given process.

8. The method of claim 1, wherein hardware prefetch is enabled for the first processor and disabled for the second processor.

9. The method of claim 1, wherein determining a prefetch status for a given process includes receiving a system call from the given process.

10. The method of claim 1, wherein determining a prefetch status for a given process and setting a hardware prefetch state on a given processor are performed by a performance monitor in the given processor.

11. The method of claim 10, wherein the performance monitor determines performance statistics for the given process and determines whether hardware prefetch should be enabled for the given process based on the performance statistics.

12. A data processing system, comprising:
   at least one processor; and
   an operating system running on the at least one processor, wherein the operating system receives a first process, assigns the first process to run on a first processor, determines a first prefetch status for the first process at each of successive times when the first process is running, wherein each determined first prefetch status indicates whether hardware prefetch should be enabled or disabled for the next following computational phase of the first process, sets a first hardware prefetch state on the first processor based on each determined first prefetch status, to correspondingly enable or disable said hardware prefetch;

receives a second process, assigns the second process to run on a second processor, determines a second prefetch status for the second process at each of successive times when the second process is running, wherein each determined second prefetch status indicates whether hardware prefetch should be enabled or disabled for a next following computational phase of the second process, and sets a second hardware prefetch state on the second processor based on each determined second prefetch status, to correspondingly enable or disable said hardware prefetch.

13. The data processing system of claim 12, wherein a hardware prefetch of each processor of said data processing system is individually enabled or disabled, selectively.

14. The data processing system of claim 12, wherein the operating system determines the prefetch status by examining a prefetch status indicator in a given process.

15. The data processing system of claim 14, wherein the prefetch status indicator is a bit in a machine status word.

16. The data processing system of claim 15, wherein the operating system sets a hardware prefetch state on a given processor by writing the machine status word to a machine status register in the given processor.

17. The data processing system of claim 12, wherein the first prefetch status is enabled and the second prefetch status is disabled.

18. The data processing system of claim 15, wherein the machine status word is included in a context block of the given process.

19. The data processing system of claim 12, wherein hardware prefetch is enabled for the first processor and disabled for the second processor.

20. The data processing system of claim 12, wherein the operating system determines a prefetch status for a given process by receiving a system call from the given process.

21. A computer program product, embedded in a computer readable recordable media and executable by a data processing system, comprising:

instructions for receiving a first process, comprising successive computational phases, to be executed by a processor in a data processing system;

instructions for assigning the first process to run on a first processor;

instructions for determining a first prefetch status for the first process at each of successive times when the first process is running, wherein each determined first prefetch status indicates whether hardware prefetch should be enabled or disabled for a next following computational phase of the first process;

instructions for setting a first hardware prefetch state on the first processor based on each determined first prefetch status, to correspondingly enable or disable said hardware prefetch;

instructions for receiving a second process, comprising successive computational phases, to be executed by a processor in the data processing system;

instructions for assigning the second process to run on a second processor;

instructions for determining a second prefetch status for the second process at each of successive times when the second process is running, wherein each determined second prefetch status indicates whether hardware prefetch should be enabled or disabled for a next following computational phase of the second process; and instructions for setting a second hardware prefetch state on the second processor based on each determined second prefetch status, to correspondingly enable or disable said hardware prefetch.

22. The computer program product of claim 21, wherein a hardware prefetch of each processor of said data processing system is individually enabled or disabled, selectively.

23. The computer program product of claim 21, wherein determining a prefetch status includes examining a prefetch status indicator in a given process.

24. The computer program product of claim 23, wherein the prefetch status indicator is a bit in a machine status word.

25. The computer program product of claim 21, wherein setting a hardware prefetch state on a given processor includes writing a machine status word to a machine status register in the given processor.

* * * * *